United States Patent [19]

Lorenzo

[11] Patent Number: 5,502,312
[45] Date of Patent: Mar. 26, 1996

[54] DOUBLE DOCUMENT DETECTION SYSTEM HAVING DECTECTOR CALIBRATION

[75] Inventor: John L. Lorenzo, Southbury, Conn.

[73] Assignee: Pitney Bowes Inc., Stamford, Conn.

[21] Appl. No.: 223,185

[22] Filed: Apr. 5, 1994

[51] Int. Cl.$^6$ .............................. G01N 21/32; G01J 1/32
[52] U.S. Cl. .................. 250/559.1; 250/559.12; 250/559.27; 250/559.4; 250/205
[58] Field of Search .......................... 250/559.1, 559.12, 250/559.13, 559.27, 559.28, 559.4, 223 R, 222.1, 221, 205

[56] References Cited

U.S. PATENT DOCUMENTS

| | | | |
|---|---|---|---|
| 3,679,202 | 7/1972 | Rauffer | 271/57 |
| 3,873,843 | 3/1975 | Martin | 250/561 |
| 3,970,857 | 7/1976 | Buckson | 250/559.1 |
| 4,533,133 | 8/1985 | Hams | 271/9 |
| 4,697,246 | 9/1987 | Zemke et al. | 364/563 |
| 4,906,842 | 3/1990 | Melcher | 250/205 |
| 4,922,110 | 5/1990 | Melchor | 250/556 |
| 5,067,704 | 11/1991 | Tsuihiji et al. | 271/262 |
| 5,369,285 | 11/1994 | Georgis et al. | 250/559.28 |

*Primary Examiner*—Edward P. Westin
*Assistant Examiner*—John R. Lee
*Attorney, Agent, or Firm*—Angelo N. Chaclas; Charles R. Malandra; Melvin J. Scolnick

[57] ABSTRACT

An electro-optical system for double document detection wherein an improved calibration is employed. A microcontroller generates a series of increasingly wider pulses, which are transformed into a series of respective increasingly higher ramp pulses to drive a light emitter at gradually increased power until a predetermined value of an output signal of a light detector is achieved. Then the pulse width corresponding to the predetermined value of the output signal is fixed. During feeding of documents, the microcontroller monitors the output signal to determine a double-feed document condition if the output signal exceeds a predetermined value. To detect a "true" double-feed document condition, a software timer counts a prolongation of the alteration of the output signal. Also, in order not to miss a "true" double-feed document condition when the area of overlapping is small, the distance between a front edge of the first overlapped document and a rear edge of the last overlapped document is measured. The system also declares a double-feed document condition if a space between two fed documents is no greater than a predetermined value. The system also provides a safety circuit to protect the light emitter from excessive power dissipation. If the situation of power down in the system occurs, a recalibration is not needed, since the system is provided with a non-volatile memory to store the fixed width. Each stage of the system is indicated by LEDs.

32 Claims, 5 Drawing Sheets

DOUBLE DOCUMENT DETECTION SYSTEM HAVING DECTECTOR CALIBRATION

FIELD OF THE INVENTION

The present invention relates to an electro-optical system for document detection in an inserter system of a document handling system, and, more particularly, to a document detection system especially designed for the detection of a "double-feed" document condition.

BACKGROUND OF THE INVENTION

In document handling systems, documents such as checks, currency, letters and the like, are transported one by one successively to the inserter system with a relatively high velocity up to 150 inches per second. The document detection system of the inserter system is intended to recognize information from each document and to supply this information to a processing means.

However, an undesirable situation may occur when two or more documents are fed to the inserter system at the same time. This situation, known as a double-feed document condition, must be detected immediately in order to generate an alarm signal and/or to shut down the document handling system. Presently, these document detection systems are either mechanical or electro-optical.

The known mechanical technique (described, for example, in U.S. Pat. No. 3,679,202) involves setting the gap of a roller under which the paper travels. When a paper having a thickness greater than the desired paper thickness passes through the roller (as would be the case for a double-feed document condition) an alarm signal is produced. This known technique is very difficult to set for thin documents, and the system frequently runs out of adjustment because of vibration, wear and the like.

Electro-optical double detection systems (as described in U.S. Pat. Nos. 3,873,843 and 4,906,842) take advantage of a light emitter and a corresponding light detector, both positioned on opposite sides of the feed path for the documents. The light emitter generates a beam of light which passes through the document(s) in the inserter system and is detected by the light detector. The light detector produces an output signal which is a function of the opacity of the document(s) between the light emitter and the light detector. The output signal is calibrated to a normal condition in which a single document is fed to the inserter system. However, when a double-feed document condition occurs, the output signal changes sufficiently so as to cause an alarm signal.

In a double detection system presently used by the assignee of the present invention, two sets of light emitting diodes (LEDs) and detectors are employed, and the setting of five interrelated potentiometers is required.

In these electro-optical double detection systems, the output level setup procedure is tedious and time consuming. Moreover, variations and deterioration of circuitry components, voltage variation over time, slight misalignment, different color of paper, presence of paper dust and the like, require continual adjustment of the preset signals of the light emitter and light detector.

Additionally, U.S. Pat. No. 5,067,704 describes an apparatus which includes a light control circuit for controlling the intensity of the light emitter (by switching in various resistors), a variable gain amplifier for amplifying the output of the light detector, and a central processing unit (CPU) for setting the intensity of the light emitter and the gain of the amplifier. The output of the amplifier determines a double-feed document condition. This apparatus, however, requires an operator involvement.

Another disadvantage of these electro-optical double detection systems is that the detector output signal can increase due to a black mark or a logo on the document, paper flutter, etc.

Therefore, it would be desirable to provide a simple and reliable method of calibration without substantial and time-consuming operator involvement to distinguish between false and true double document conditions, and to detect a slight overlapping or slight gap of adjacent documents.

SUMMARY OF THE INVENTION

It is, therefore, an object of the present invention to provide a reliable and simple method of calibration in a double document detection system.

It is another object of the present invention to provide an autocalibration double document detection system.

It is yet another object of the present invention to provide a method and system for detection of a "real double" thereby avoiding "false alarms".

It is a further object of the present invention to provide a closed-loop double document detection system capable of a continual self adjustment to accommodate component deterioration and variation, voltage variations, slight misalignments, paper dust, and the like.

It is a still further object of the present invention to provide the software for an improved double document detection system.

It is a yet still further object of the present invention to provide an autocalibration double document detection system which does not require a recalibration in the event of a power outage or normal shut down.

It is, again, another object of the present invention to provide an autocalibration double document detection system which employs a calibration document and which indicates each stage of the calibration cycle.

In order to calibrate the double document detection system of the present invention, a series of increasingly wider pulses is generated after a calibration document is provided in a document feed path between a light emitter (light for this purpose includes radiation from ultraviolet to infrared, including visible) and a corresponding light detector. This series of increasingly wider pulses is transformed into a respective series of increasingly higher ramp pulses which are supplied to a driving means for the light emitter. This driving means generates a series of drive pulses corresponding directly to increasingly higher ramp pulses and indirectly to increasingly wider pulses. These drive pulses drive the light emitter to generate light at a predetermined level to penetrate the calibration document in the document feed path and to cause the light detector to generate an output signal. The output signal is monitored until it reaches the predetermined value. When the predetermined value of the output signal is reached, the width of the increasingly wider pulses is fixed, thereby calibrating the double document detection system; and when the calibration document is removed from the document feed path, the drive pulses corresponding to the pulses of the fixed width will drive the light emitter at the predetermined level.

Each increasingly higher ramp pulse starts from the same voltage level. All ramp pulses are amplified and supplied to the driving means, which preferably comprises a transistor. The transistor and the light emitter are protected against damage by excessive power dissipation; and the transistor is cut off until the peak time of each supplied ramp pulse, thereby protecting it, and the light emitter against unnecessary power dissipation.

Generation of increasingly wider pulses may be initiated by an operator or automatically. If the calibration takes place automatically, an external command is received indicating a document which the double document detection system will consider as the calibration document. As the document is passing between the light emitter and the light detector, a series of detector output values, is processed and an average value is used for the fixed width pulse.

The fixed width of the pulse is stored in a non-volatile memory to be read back if a power outage or normal shut down occurs, so that it is not necessary to recalibrate the system.

Since the system is a closed-loop, it provides a self adjustment at each calibration for component deterioration, voltage and component variation, slight misalignment, paper dust, and other conditions normally encountered over the useful life of the paper handling apparatus.

The output signal of the light detector is checked against a predetermined level to determine a "double-feed" document condition, which occurs when the output signal exceeds the predetermined level. Then the microcontroller increments a programmed counter to accumulate double-feed document detections. When a predetermined number of contiguous detections occur, a "true" double condition is indicated. This eliminates a "false" double-feed document condition caused by a logo, dark print, paper flutter and the like.

In order not to miss a detection of the "double-feed" document condition if two subsequent documents are overlapped by a small overlapping area, the distance between a front edge of the first overlapping document and a rear edge of the second overlapping document is measured, and the system will indicate a "double-feed" document condition if this distance exceeds a predetermined value. The predetermined value may be changed for various speeds and document sizes by a series of switches.

Also, if a slight gap is present between two documents, known as "stream feed" the gap will be ignored, and the double-feed document condition will be declared.

The double document detection system also includes means for indicating the status of the calibration, namely, whether the calibration has been initiated on whether it is continuing, has been completed, or did not succeed.

These and other objects of the present invention will become apparent from a reading of the following specification taken in conjunction with the enclosed drawings.

DETAILED DESCRIPTION OF THE PREFERRED EMBODIMENTS

Figure 1:
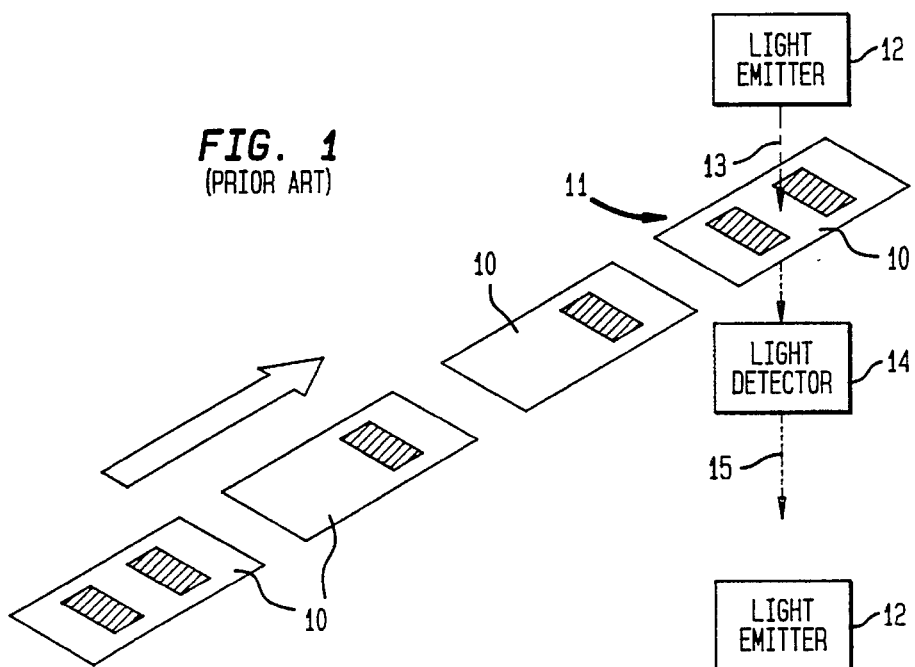
FIG. 1 is a schematic view of transporting documents along a document feed path used in the prior art.

With reference to FIG. 1, documents 10 are successively advanced one by one along a document feed path 11. A light emitter 12 (such as an LED, a laser diode or fiber optic coupled laser) generates light 13 usually of infrared (or other) radiation to penetrate through the document 10 between the light emitter 12 and a light detector (such as a photo-transistor) 14. The light detector 14 generates an output signal 15 which is a function of an opacity of the document 10 in the document feed path 11.

Figure 2:
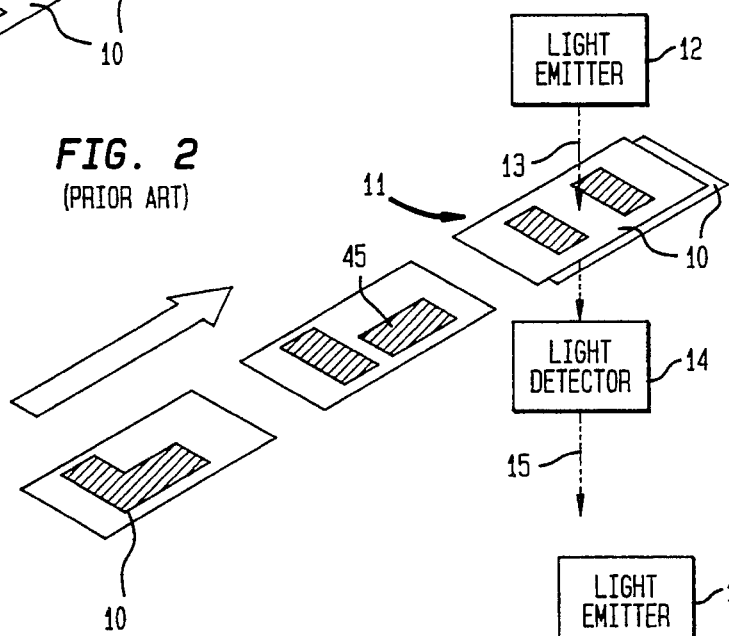
FIG. 2 is a schematic view of a double-feed document condition encountered in the prior art.
Figure 3:
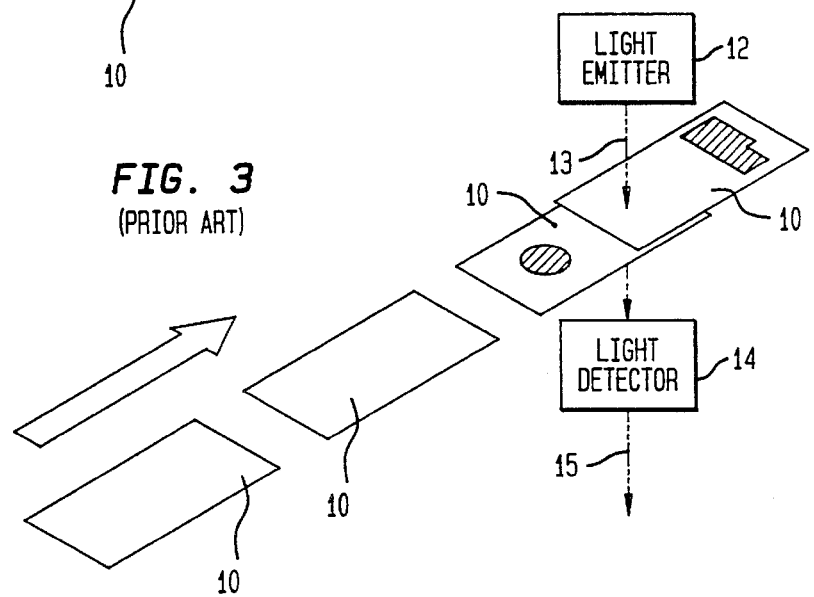
FIG. 3 is a schematic view of another type of a double-feed document condition encountered in the prior art.
Figure 4A:
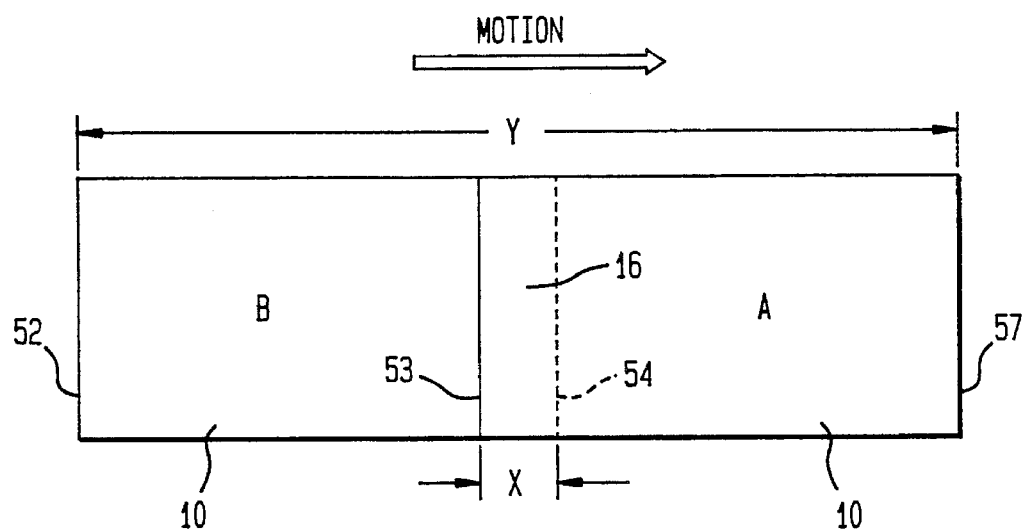
FIG. 4A shows two overlapped documents detected by the present invention.

FIGS. 2, 3, and 4A show a double-feed document condition in the document feed path 11, when two documents 10 are almost completely overlapped (FIG. 2) or when the area of overlapping 16 is very small (FIG. 4A). The output signal generated by the light detector 14 will be sufficiently different than the output signal generated at the condition of FIG. 1.

The value of the output signal 15 is analyzed to determine if there is one or more documents present in the document feed path 11.

Figure 5:
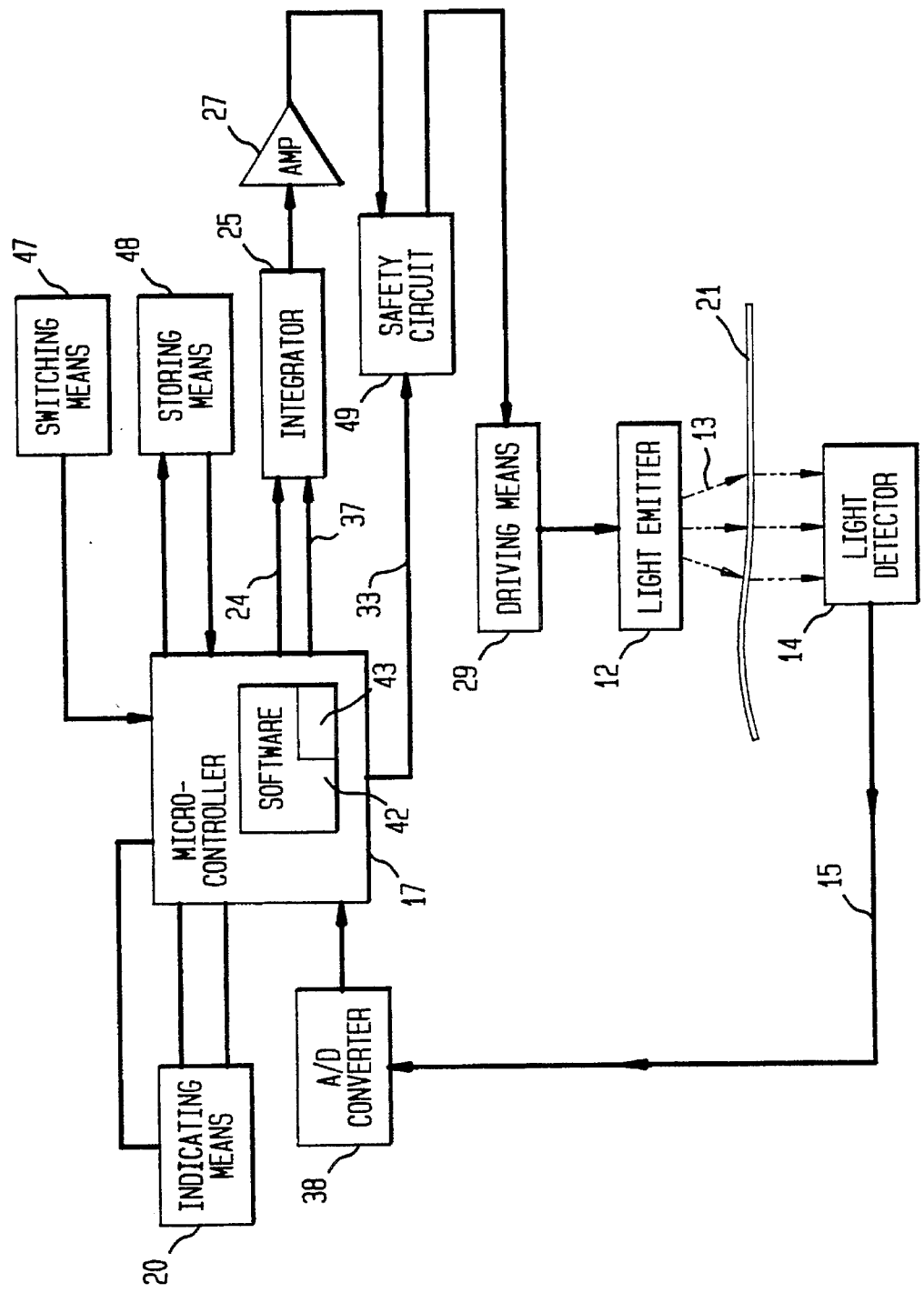
FIG. 5 shows a block diagram of the double document detection system according to the present invention.
Figure 6:
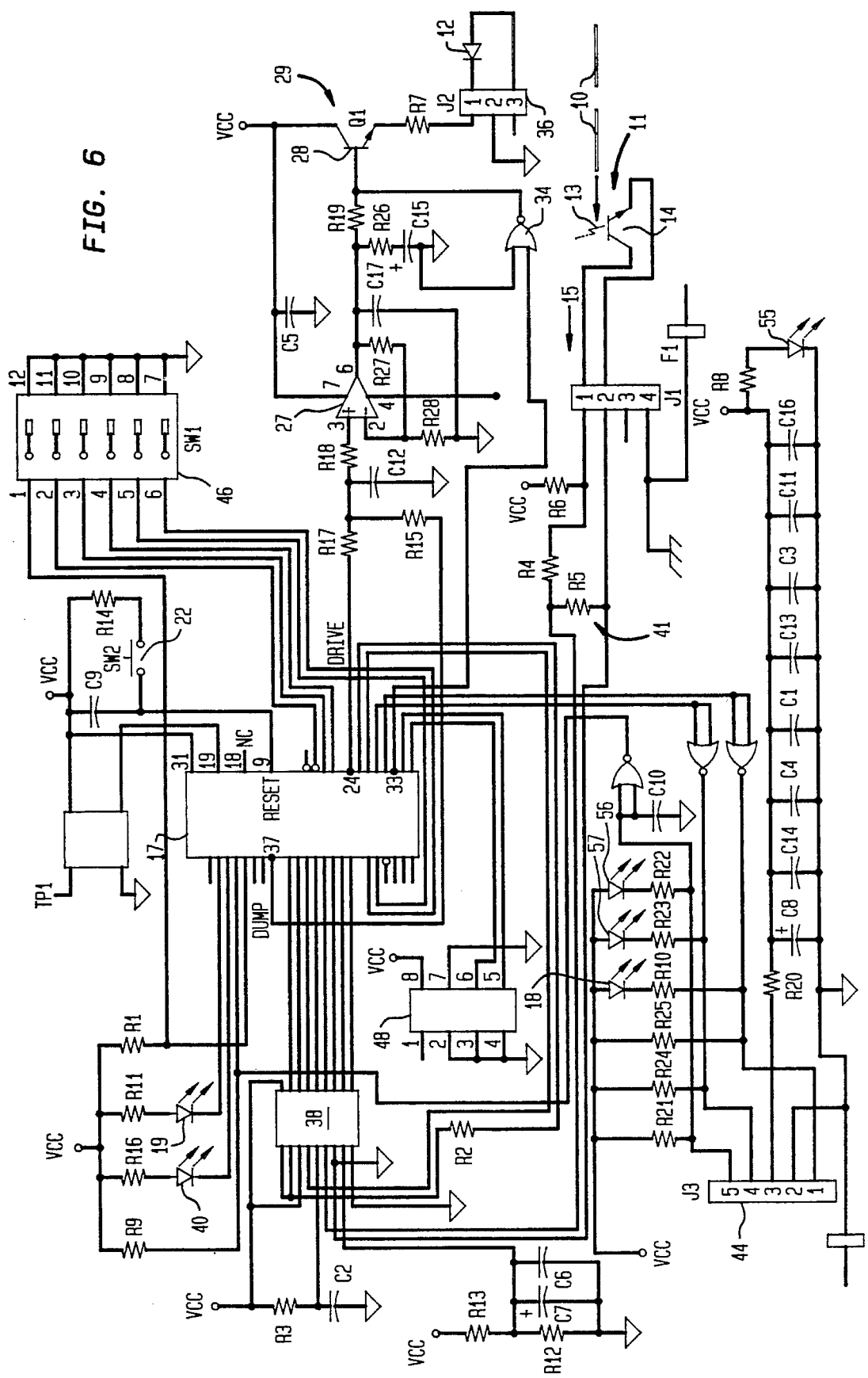
FIG. 6 shows an electrical wiring diagram of the system of the present invention, pursuant to the block diagram thereof.
Figure 7A:
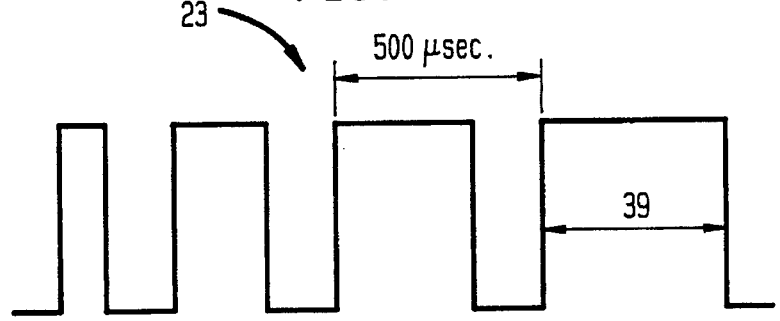
FIGS. 7A and 7B show a series of increasingly wider and increasingly higher pulses, respectively.

In accordance with the present invention (FIGS. 5 and 6), the system operates in a CALIBRATION mode (including AUTOCALIBRATION and SEMI-AUTOMATIC CALIBRATION) and in a RUN mode. At power up, a reset of a microcontroller 17 via C9 causes the red LED 18 and the green LED 19 of the indicating means 20 to blink alternately, indicating an uncalibrated condition. To calibrate the system, a calibration document 21 (the document to be run) is placed between the light emitter 12 and the light detector 14, and the calibrate push-button switch 22 (for SEMIAUTOMATIC CALIBRATION) is pressed. This puts the system into the CALIBRATION mode, causing the microcontroller 17 to send out a 2 KHz (500 μsec period) series of increasingly wider pulses 23 on the "Drive" output 24 of the microcontroller 17 (as shown in FIG. 7A). Each pulse 23 is integrated by an integrating means 25, which includes R17 and C12, creating increasingly higher ramp pulses 26 (FIG. 7B), which are amplified (approximately 4.5 times) by an amplifier 27 and applied to the base 28 of the transistor 29. It will be appreciated by those skilled in the art that the integrating means 25 could be replaced with a digital-to-analog converter, if desired.

Figure 7B:
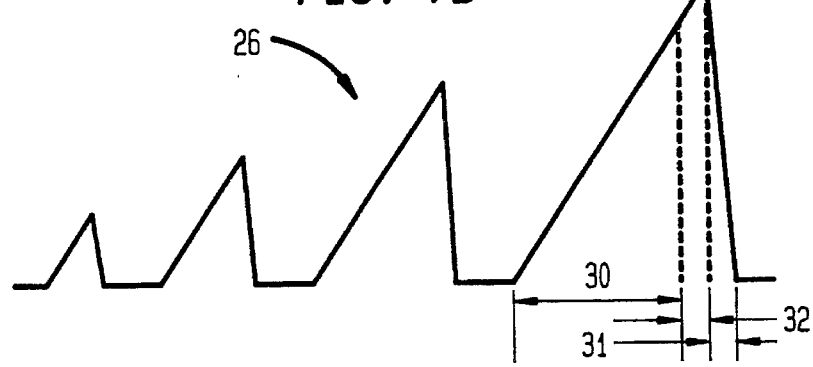
Figure 7C:
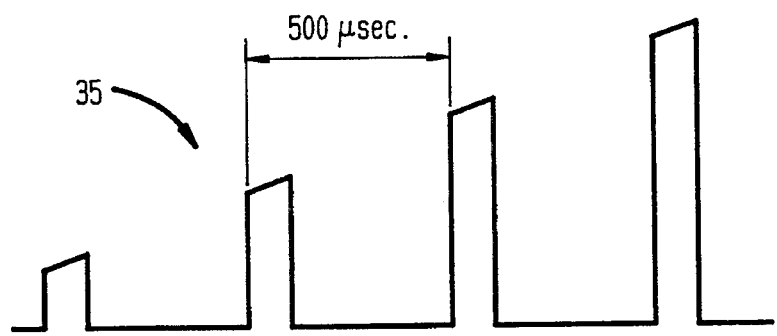
FIG. 7C shows drive pulses generated in response to the pulses of FIGS. 7A and 7B.
Figure 8:
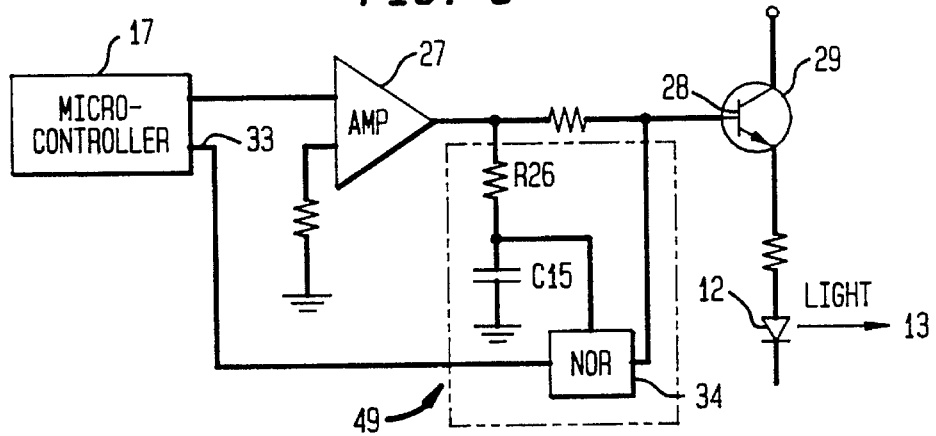
FIG. 8 is a schematic diagram of a safety circuit of the present invention.

As shown in FIG. 7B, each ramp pulse 26 includes a ramp time 30, a pulse fall time 31 and a peak time 32 between the ramp time 30 and the pulse fall time 31. The microcontroller 17 via output 33 and NOR gate 34 (shown in FIG. 8) switches off the transistor 29 until the twenty (20) μsec peak time 32 of each ramp pulse 26. This creates a twenty (20) μsec drive pulse 35 (FIG. 7C) to the light emitter 12 through resistor R7 and connector 36 (J2-1). This four percent (4%) duty cycle allows the light emitter 12 to be driven at a current in excess of one (1) Amp for penetration of a document as thick as a business card.

The output 37 of the microcontroller 17 discharges capacitor C12 of most of its charge prior to the issue of the next drive pulse 35. Subsequently, each ramp 26 starts from the same voltage level. As the pulses 35 at the light emitter 12 increase in amplitude (FIG. 7C), the output signal 15 of the light detector 14 is monitored by the microcontroller 17 via an analog-to-digital converter 38. The first few pulses probably will not cause any change of the output signal 15, but eventually, depending upon the opacity of the calibration document 21, the light 13 will pass through the calibration document 21 and impinge upon the light detector 14, causing the output signal 15 to decrease. When the output signal 15 reaches about 1.5V (with a voltage supply of 5.0V), the pulse width 39 of the output 24 of the microcontroller 17 is fixed. This fixed pulse width 39 now becomes the drive for the light emitter 12 until another calibration changes it. At this point, red LED 18 and green LED 19, remain "on" until the calibration document 21 is removed from the document feed path 11, after which the system automatically reverts to the RUN mode.

In the RUN mode, when the light beam 13 is not blocked (no document 10 is present in the document feed path 11), a yellow LED 40 blinks "on" and "off" indicating that the system is ready, while the microcontroller 17 emits the 2 KHz pulses of width 39 predetermined and fixed in the CALIBRATION mode for driving the light emitter 12. With no document blocking the light beam 13., the output signal 15 is very low (in the vicinity of 0.3V). This value is monitored by the microcontroller 17 after going through the resistor-divider 41, including resistors R4 and R5, and the analog-to-digital converter 38. When the output signal 15 exceeds a predetermined value (0.8V), the software program 42 in the microcontroller 17 determines that a document 10 is passing through the light beam 13. The green LED 19 turns "on" and a software counter 43 within the microcontroller 17 (shown schematically in FIG. 5) is enabled. The output signal 15 through the resistor-divider 41 is converted to a digital value by the AD converter 38 and is evaluated by the microcontroller 17. The value of each output signal 15 resulting from the light beam 13 is checked against a required value of about 3.0V. If this value is exceeded, indicating a double-feed document condition, the software counter 43 in the microcontroller 17 is incremented. If a "true" double-feed document condition is present, all subsequent values of the output signal 15 will be above the 3.0V reference, and the counter 29 will count up to a predetermined value of forty-eight (48) after which a signal indicating a "double-feed" document condition will be sent out via a connector 44 (J3-1) and the red LED 18 will turn "on". If, on another hand, the 3.0V level was caused by a black mark 45 (see FIG. 2) or paper flutter (not really a double) then one of the next beams of the light emitter 12—before getting to the count of forty-eight (48)—will cause an output signal below 3.0V level, and this condition will reset the counter 43. This sampling process of forty-eight (48) tests takes about 2.2 inches of motion of the document 10 being checked at a speed of 90 inches per second. It will, however, eliminate false doubles caused by logo, dark print, paper flutter 45 and the like.

It will be appreciated, that the multiple contiguous double tests to declare a "true" double-feed document condition may be also performed with a number of counts different than forty-eight (48), if desired.

After the counter 43 is reset, at the next double detection the counting starts from zero.

With reference again to FIG. 4A, if two documents 10 are fed to the document feed path 11 in such a way that the second document B is overlapping the first document A by a small amount (such that the area of overlapping 16 is less than approximately two (2) inches), the opacity detection will fail because the length of the double-feed document condition is less than the length required for forty-eight (48) sample counts (about 2.2 inches at 90 inches per second). Therefore, the double-feed document condition will be missed. To prevent this error, the distance "Y" (FIG. 4A) is measured between a front edge 57 of the document A and a rear edge 52 of the document B. This is possible since a document size and speed of motion is known. The double-feed document condition will be declared if the distance "Y" exceeds a predetermined value, for example, fourteen (14) inches for 8.5 inches ×11 inches documents. Other values may be selected by setting of the switching means 47. Also, if the system's speed is changed significantly, the switching means 47 canine set to compensate for the speed change. The switching means 47 is also used to compensate for other variables which may arise.

Figure 4B:
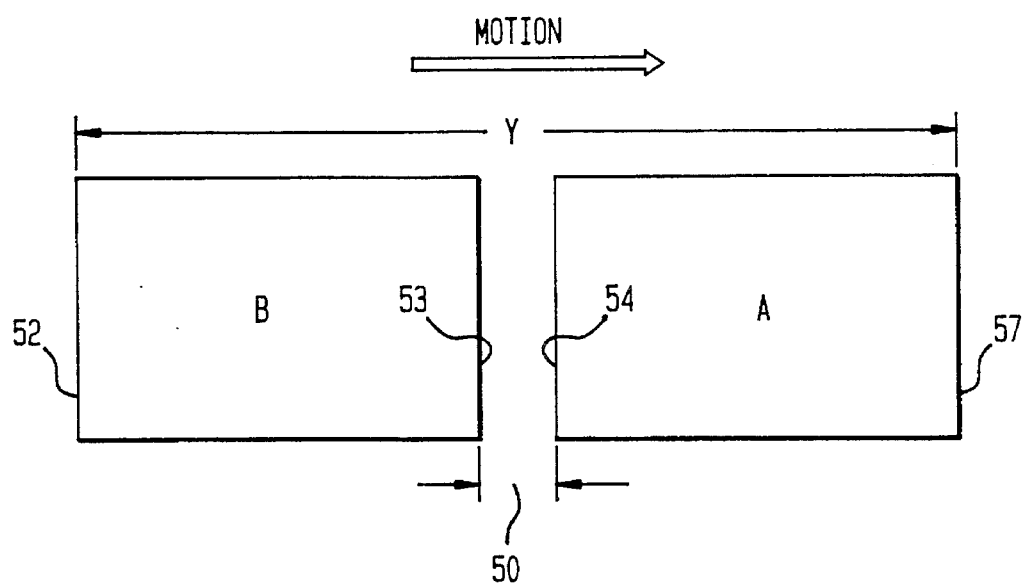
FIG. 4B shows two documents at a "stream feed" condition.

With the reference to FIG. 4B, a "stream feed" condition may be encountered when two documents A and B are fed into the document feed path 11, but there is no overlap. There is actually a small space 50 between the rear edge 54 of the document A and the front edge 53 of the document B. As long as the space 50 is no greater than a predetermined value (⅜ inch on a preferred embodiment) the software program 42 will ignore the space 50 and, since the distance "Y" exceeds the predetermined value, the double-feed document condition will be declared.

The system of the present invention is also capable of providing a completely automatic calibration mode (AUTO-CALIBRATION). This feature is selectable via switch 46 and accomplished by the system software 42 issuing a command via connector 44, input "INi" (FIG. 6 J3-5) which would indicate that the next document 10 fed will be for calibration purposes. Calibration would then take place automatically and an acknowledgement sent back to the system via the output "CAU" of the connector 44 (FIG. 6, J3-4). "CAL" is also used to indicate to the system that the calibration was not a success.

The switching means 47 (FIG. 5) includes the switch 22 and the switch 46 (FIG. 6). The switch 46 is a DIP switch assembly consisting of six independent switches, SW1-1 through SW1-6, providing 64 possible settings for different functions and variables.

The indicating means 20 includes six LEDs (18, 19, 40, 55, 56, 57). The red LED 55 will be "on" whenever power is applied to the system. The red LED 18 blinks "on" and "off" while the green LED 19 blinks "off" and "on" indicating an uncalibrated condition when power is first applied. After the calibrate switch (22 or 46) has been pressed, the LEDs 18 and 19 remain "on" steady until the calibration document has been removed out of the document feed path. In the RUN mode the LED 18 will turn "on" when a double signal is issued from the microcontroller 17. It will remain "on" for about 3 seconds.

The green LED 19 (in the RUN mode) will turn on when a document 10 interrupts the light 13. It will remain on as long as the light 13 is blocked.

The yellow LED 40 blinks "on" and "off" (after the calibration has been accomplished and no document blocking the light 13) indicating a "ready" condition. When in AUTOCALIBRATION mode, it will remain "on" steady indicating a "ready" condition for that mode.

The green LED 56 (an input indicator) will turn "on" whenever a low signal is applied to the input "INi" of the connector 44 (J3-5).

The red LED 57 will turn "on" whenever output "CAL" of the jack 44 (J3-1) is active (low).

The fixed width 39 predetermined in the CALIBRATION mode is stored in a non-volatile memory 48 (FIG. 5) which will receive the fixed value 39 as soon as it is determined and retain it through a power outage (or power down). Subsequently at power up, the value of the fixed width 39 is reloaded into the microcontroller 17, eliminating the need to recalibrate the system as long as the same type of document is being run.

As mentioned above, the NOR gate 34 controls the "on" time of the transistor 29 via the output 33 of the microcontroller 17. It also provides a safety circuit 49 to protect the transistor 29 and the light emitter 12 from damage by excessive power dissipation. If the output of the amplifier 27 remains high because of a hardware or software 42 failure, the RC combination (R26 and C15) of the safety circuit 49 will cause the NOR gate 34 to shut down the transistor 29 before there is damage to either the transistor 29 or the light emitter 12.

Since the system of the present invention is a closed loop, it is capable of self compensating for component variation, component deterioration, voltage variation over time, slight misalignment, and the like. For example, if the light emitter 12 accumulated paper dust on its surface, the calibrated current would be slightly higher to compensate for a reduced energy of light 13 emitted from it. Likewise, if over time the light emitter 12 energy emission has deteriorated, more current would be driven through it to achieve the predetermined output signal 15 of the light detector 14.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a double document detection system, wherein documents are successively advanced along a document feed path located between a light emitter and a corresponding light detector for generating an output signal, and wherein means are provided responsive to the output signal to detect the double document condition, the improved method of calibrating the system comprising the steps of providing a calibration document in the document feed path, generating a series of increasingly wider pulses, generating a series of drive pulses corresponding to the increasingly wider pulses for driving the light emitter at a required energy level, monitoring the output signal of the light detector until the output signal reaches a predetermined value, and fixing the width of one of the pulses in the series of increasingly wider pulses corresponding to the output signal of the predetermined value.

2. The method of claim 1, further including the step of transforming said series of increasingly wider pulses into a series of respective ramp pulses of increasing height, wherein the generation of the drive pulse takes place when the height of the respective ramp pulse reaches its peak value, and wherein each ramp pulse starts from the same voltage level.

3. The method of claim 1, further including the steps of storing the fixed width of the pulse until another calibration document is provided and providing non-volatile memory for storing the fixed width of the pulse.

4. The method of claim 1, further including the step of protecting the light emitter from damage by excessive power dissipation.

5. In a double detection system calibrated to a single document condition in a calibration cycle, wherein documents are successively advanced along a document feed path between a light emitter and a corresponding light detector to generate an output signal, a method of detecting a double-feed document condition, including the steps of: generating pulses of a width predetermined in the calibration cycle, transforming said pulses into corresponding ramp pulses, generating drive pulses corresponding to said ramp pulses, monitoring the output signal, and indicating a double-feed document condition if the monitored output signal exceeds the required value.

6. The method of claim 5, further including the steps of automatically adjusting the pulse of the width predetermined in the calibration cycle to provide self compensation of the generated light to the required level and output signal to the predetermined value.

7. The method of claim 5, further including the step of protecting the light emitter from damage by excessive power dissipation.

8. The method of claim 5, wherein the output signal exceeds the required value, further including the steps of counting a length of the double-feed document condition and detection of a "true" double if the length of the double-feed condition exceeds the predetermined value.

9. The method of claim 5, wherein a first document and a following document in the document feed path are overlapped, and wherein each of the overlapped documents has a front and a rear edge, the method further including the steps of measuring a distance between the front edge of the first document and the rear edge of the following document and detecting a "true" double if the distance between the front edge of the first document and the rear edge of the following document exceeds a predetermined distance.

10. The method of claim 9, wherein the predetermined distance may be set up for various document sizes and speeds of the documents motion.

11. In an apparatus, wherein documents are successively advanced along a document feed path located between a light emitter and a corresponding light detector to generate an output signal, and wherein means are provided responsive to the output signal to detect a double feed document condition, a calibration means comprising:

means for generating a series of increasingly wider pulses, when a calibration document is provided in the document feed path, means for generating drive pulses corresponding to the increasingly wider pulses for driving the light emitter, means for monitoring the output signal of the light detector until it reaches a predetermined value, and means for fixing the width of one of the pulses in the series of increasingly wider pulses corresponding to the output signal of said predetermined value.

12. The apparatus of claim 11, further including means for transforming the series of increasingly wider pulses into a series of respective increasingly higher ramp pulses, each ramp pulse including a peak time, means for switching-off the means for generating the drive pulses until the peak time of each ramp pulse, and means for starting each ramp pulse from the same voltage level.

13. The apparatus of claim 12, further including means for storing the fixed width of the pulse.

14. The apparatus of claim 12, further including means for indicating the status of the calibration.

15. The apparatus of claim 12, further including means for protecting the light emitter from damage by excessive power dissipation.

16. A double document detection system comprising:
a microcontroller,
a microcontroller-controlled means for calibrating the system in a calibration cycle,
microcontroller-controlled means for generation of a series of identical pulses of the width predetermined in the calibration cycle,
microcontroller-controlled means for storing said predetermined width of the pulse,
means for transforming pulses of the predetermined width into respective ramp pulses, each ramp pulse having a peak time,
means for driving the light emitter by drive pulses corresponding to said ramp pulses, wherein the drive pulses are generated at the peak time of the respective ramp pulse,
microcontroller-controlled means for continually comparing the output signal with a required value, and
microcontroller-controlled means for detection of a double-feed document condition when the output signal exceeds the required value.

17. The system of claim 16, further including microcontroller-controlled means for continual self-adjustment of the light emitter to variable conditions.

18. The system of claim 16, further including means for protecting the light emitter from excessive power dissipation.

19. The system of claim 16, wherein a situation of power down may occur, further including means for restoring the predetermined width from the storing means immediately after the power up.

20. The system of claim 16, further including indicating means for indicating the stage of the system operation.

21. The system of claim 16, further including means for testing a time of a prolongation of the detected double document condition and means for detecting a "true" double if said prolongation exceeds a predetermined value.

22. The system of claim 16, further including means for measuring a distance between a front edge of a first document and a rear edge of a following document between the light emitter and the light detector, means for detecting a double-feed document condition if said distance exceeds a predetermined distance, and means for adjustment the predetermined distance to various document sizes and speeds of the document mentioned.

23. In a double document detection system, wherein documents are successively advanced along a document feed path located between a light emitter and a corresponding light detector for generating an output signal, wherein the output signal is responsive to an opacity of at least one document in the document feed path, and wherein changing of the opacity of the document in the document feed path causes an alteration of the output signal to be detected, an improved method for the "true" double-feed document detection comprising the steps of:
counting a prolongation of the detected alteration of the output signal and comparing said prolongation with a predetermined value.

24. The method of claim 23, further including the step of indicating a "true" double-feed document condition if said prolongation exceeds the predetermined value.

25. The method of claim 23, wherein a first and a second documents are overlapped, wherein an area of overlapping is of a small value, and wherein the prolongation of the alteration of the output signal due to the small area of overlapping is less than the predetermined value, further comprising the steps of:
measuring a distance between a front edge of the first overlapped document and a rear edge of the second overlapped document, comparing said distance with a predetermined distance, and indicating the overlapping of the documents as a double-feed document condition if said distance exceeds the predetermined distance.

26. The method of claim 23, further including the step of adjusting the predetermined value to various document sizes and speeds of the document motion.

27. In an apparatus, wherein a light emitter generates light in response to drive pulses generated by a transistor, the transistor having a base, wherein the transistor generates drive pulses corresponding to pulses supplied to the base, and wherein excessive power dissipation may cause a damage of said transistor and said light emitter, a safety circuit for prolonging the light emitter life and for protecting both the transistor and the light emitter the safety circuit having a circuit ground, the safety circuit comprising:
a NOR gate including inputs and an output;
a microcontroller including a plurality of outputs such that one of the outputs of the microcontroller is connected to one of the inputs of the NOR gate;
a resistor and a capacitor, the resistor having first and second terminals, the capacitor having first and second terminals, wherein the second terminal of the resistor and the first terminal of the capacitor are connected to each other and to the first input of the NOR gate, and wherein the second terminal of the capacitor is connected to the circuit ground;
wherein the output of the NOR gate is connected to the base of the transistor, such that the NOR gate shuts down the transistor if the power of the supplied pulses exceeds a permissible value.

28. The apparatus of claim 27, wherein the pulses supplied to the base of the transistor are ramp pulses, each ramp pulse having a peak value, and wherein said microcontroller through the NOR gate holds off the transistor until the peak value of the ramp pulse.

29. In a double document detection circuit for a document handling system, wherein documents are successively advanced between a light emitter and a light detector, wherein driving means drives the light emitter to generate light in response to ramp pulses, the ramp pulses having an entire ramp period and a peak value, wherein the driving means comprises a transistor biased to cut-off, the transistor having a base, and wherein driving the light emitter for the entire ramp period would subject the light emitter to unnecessary power dissipation, an improvement comprising:
means for switching on the driving means only during the peak value of the respective ramp pulses, thereby increasing the light emitter life and reliability.

30. The circuit of claim 29, further including a microcontroller for controlling the means for switching on of the driving means, wherein the means for switching on includes a NOR gate, having inputs and an output, wherein one of the inputs is controlled by the microcontroller, and wherein the output is connected to the base of the transistor.

31. In a double document detection system, wherein documents are successively advanced along a document feed path, wherein first and second documents are fed to the document feed path, each document having a front edge and a rear edge, and wherein a space between the rear edge of the first document and the front edge of the second document is of a small value, a method of detecting the double-feed document condition, comprising the steps of: measuring said space between the rear edge of the first document and the front edge of the second document, ignoring said space if said space is not greater than a predetermined space valve and declaring the double-feed document condition.

32. A method for double-feed document detection in a document handling machine, wherein documents are successively advanced along a document feed path between a light emitter and a corresponding light detector, wherein the light emitter generates light of an energy level penetrating at least one document in the document feed path and causing an output signal of the light detector, wherein the output signal changes its value in respect to the opacity of at least one document in the document feed path, wherein the value of the output signal is analyzed to detect if there is more than one document in the document feed path, the method including a calibration cycle and a subsequent operation cycle, wherein the light emitter is protected from damage by excessive power dissipation, wherein the calibration cycle comprises the steps of:

providing a single calibration document in the document feed path, generating a series of increasingly wider pulses, transforming said series of increasingly wider pulses into a series of respective ramp pulses of increasing height, generating a series of drive pulses corresponding to the increasingly higher ramp pulses for driving the light emitter, monitoring the respective output signal's value until it reaches a predetermined value, fixing the width of one of the increasingly wider pulses corresponding to said predetermined value, storing the pulse of the fixed width for restoring the fixed width of the pulse in the situation of power outage immediately after the power up, and removing the calibration document from the document feed path; and wherein the operation cycle comprising the steps of:

generating pulses of the fixed width determined in the calibration cycle, transforming the pulses of determined width in the calibration cycle into ramp pulses, each ramp pulse having a peak time, generating drive pulses corresponding to said ramp pulses, wherein each ramp pulse starts from the same voltage level, wherein said drive pulses are not generated until the peak time of the respective ramp pulse; and monitoring the output signal corresponding to at least one document in the document feed path, comparing the output signal with a required value, indicating a double-feed document condition if the monitored output signal exceeds the required value, counting a prolongation of the detected double-feed document condition, detecting a "true" double if the prolongation of the double-feed document condition exceeds the predetermined value, double-feed document condition including a first and a second overlapped documents, measuring a distance between a front edge of the first overlapped document and a rear edge of the second overlapped document, and detecting a double-feed document condition if said distance exceeds a predetermined distance, wherein the predetermined distance may be set up for various document sizes and speeds of the documents motion.

\* \* \* \* \*

UNITED STATES PATENT AND TRADEMARK OFFICE
CERTIFICATE OF CORRECTION

PATENT NO. : 5,502,312
DATED : March 26, 1996
INVENTOR(S) : John L. Lorenzo

It is certified that error appears in the above-identified patent and that said Letters Patent is hereby corrected as shown below:     On the title page, and col. 1, line 2:
In the Title, change "DECTECTOR" and insert therefor --DETECTOR--.

Col. 2, line 24, after "double"", insert therefor --,--.
Col. 5, line 24, after ""off"", insert therefor --,--.
Col. 5, line 28, after "13", delete ".".
Col. 6, line 19, change "canine" and insert therefor --can be--.
Col. 6, line 36, change ""INi" (FIG. 6 J3-5" and insert therefor --IN1" (FIG. 6, J3-5)--.
Col. 6, line 40, change ""CAU"" and insert --"CAL"--.
Col. 7, line 2, change ""INi"" and insert --"IN1"--.
Col. 10, line 5:
In claim 25, line 7, delete "I".
Col. 11, line 6:
In claim 31, line 11, change "valve" and insert --value--.

Signed and Sealed this

Twenty-fifth Day of June, 1996

Attest:

BRUCE LEHMAN

*Attesting Officer*        Commissioner of Patents and Trademarks